Dec. 11, 1951  W. SANDLER  2,577,980
NONREFILLABLE BOTTLE CAP AND SPOUT
Filed Oct. 17, 1947  2 SHEETS—SHEET 1

WILLIAM SANDLER
INVENTOR.
BY
ATTORNEY

Dec. 11, 1951 W. SANDLER 2,577,980
NONREFILLABLE BOTTLE CAP AND SPOUT
Filed Oct. 17, 1947 2 SHEETS—SHEET 2
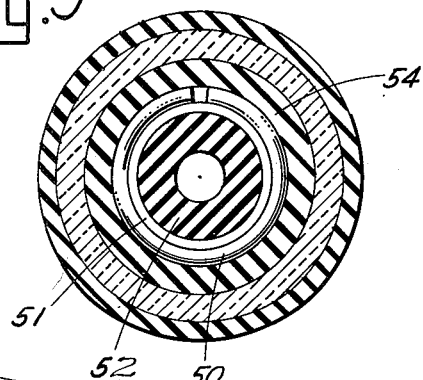
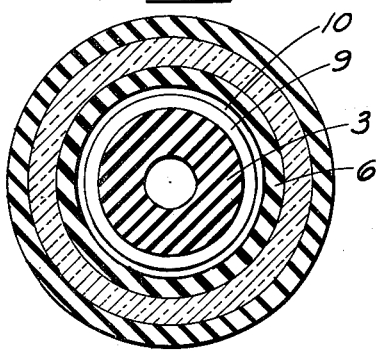
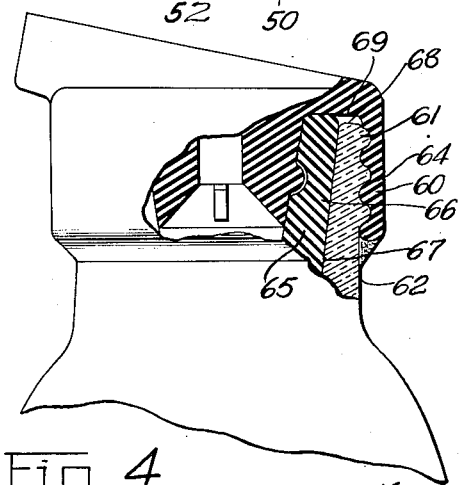
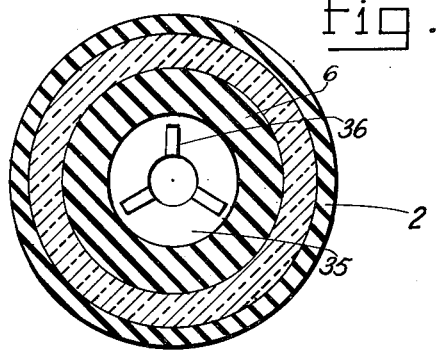
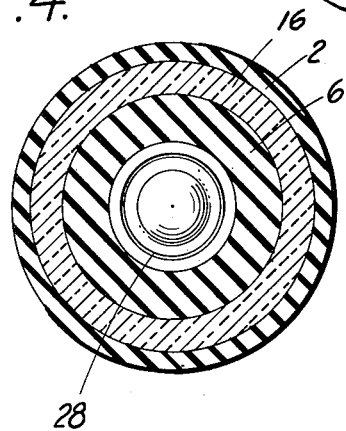
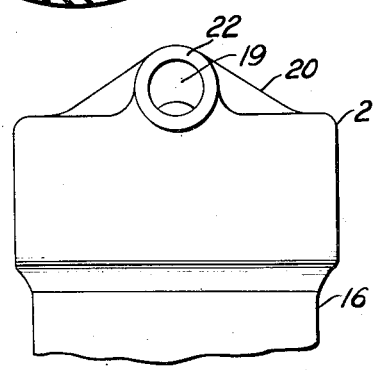
WILLIAM SANDLER
INVENTOR.
BY
ATTORNEY Patented Dec. 11, 1951

2,577,980

UNITED STATES PATENT OFFICE 2,577,980

NONREFILLABLE BOTTLE CAP AND SPOUT

William Sandler, New York, N. Y.

Application October 17, 1947, Serial No. 780,352

10 Claims. (Cl. 215—21)

1

The present invention relates to a non-refillable bottle cap, equipped with a spout for pouring a liquid from a bottle.

While there have been a number of non-refillable bottle caps made, they have been quite complicated and consequently expensive to produce, and have generally required the use of special bottles of various types.

Frequently in serving beverages from bottles, a cork with a spout attached is inserted in the neck of the bottle to control and direct the pouring of liquid from the bottle.

In the sale of alcoholic beverages and similar liquids in which quality and price standards vary considerably, there is often a strong temptation to refill an empty bottle with an inferior product, and resell it under the brand name of the manufacturer of the original product.

The primary object of my invention is to produce a bottle cap, thru which the bottle cannot be refilled, after the liquid originally in it has been poured out.

A further object is to provide in a single unit, a non-refillable bottle cap, and a spout for directing and controlling the pouring of the liquid from the bottle.

Another object is to produce a simple, compact bottle cap, combined with a spout, which can be used with an ordinarily beverage bottle, the neck of which is equipped with threads on which the cap is attached.

A further object is to produce a compact bottle cap which will seal the liquid in the bottle, and is also fitted with a dust-proof spout for pouring the liquid from the bottle.

The accompanying drawings, illustrative of several embodiments of my inventions, together with the description of the construction and functioning thereof will serve to clarify further objects and advantages thereof.

In the drawings:

Fig. 1 represents a vertical section thru the bottle cap, showing a substantially conical valve, a cap with a smooth interior, and a spout, leading from an opening in the body, thru the spout opening at the top of the cap. The cap body is fastened to an external shell by means of an integral ring formed on the tapered neck-portion of the body.

Fig. 3 represents a side view and partial section thru a modification of the bottle cap of Figs. 1 and 2. The shell is attached to the body of the cap, by means of a snap ring which fits into an

2 internal groove in the shell and an external groove in the stem of the cap.

Figures 1, 3:
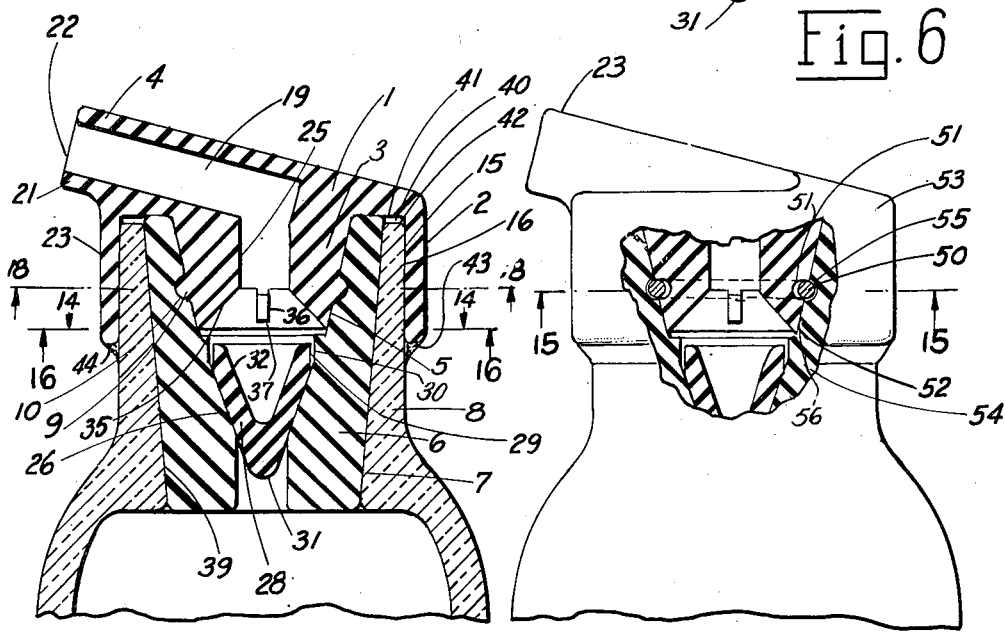

Fig. 4 represents a partial side view, and partial vertical section thru a modification of the bottle cap shown in Fig. 1. The interior of the cylindrical portion of the cap is threaded to fit the external threads on the neck of the bottle.

Figure 5:
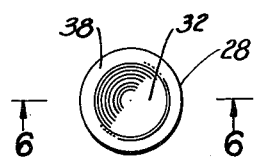

Fig. 5 is a plan view of the valve used in the cap of Fig. 1.

Figure 6:
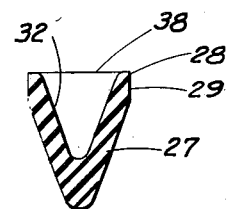

Fig. 6 is a vertical section thru the valve of Figs. 1 and 5, taken on the line 6—6 of Fig. 5.

Figure 2:
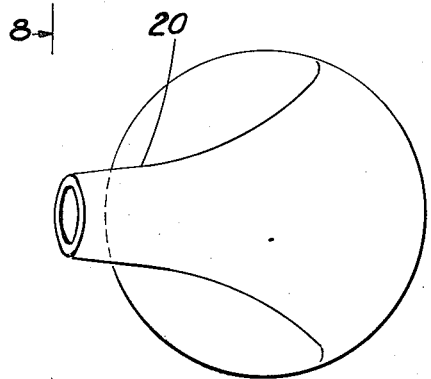
Fig. 2 represents a plan view of the bottle cap of Fig. 1.

Fig. 7 represents a left hand end view of the cap of Figs. 1 and 2, taken at 7—7 of Fig. 2.

Fig. 8 is a cross-section, looking downward, taken at 8—8 of Fig. 1.

Fig. 9 represents a cross-section taken at 9—9 of Fig. 3, showing the snap ring used to hold the shell in place on the tapered stem of the body of the cap.

Fig. 10 represents a cross-section taken at 10—10 of Fig. 1, showing the position of the radial stops for limiting the movement of the valve, when it is lifted off its seat.

Fig. 11 represents a cross-section taken at 11—11 of Fig. 1, showing the integral ring used to attach the body of the cap to the shell.

The combination bottle cap and spout, as indicated in Figs. 1 to 4, consists primarily of a substantially cylindrical hollow cap, which is attached to the neck of a bottle, a tapered stem integral with said cap, and depending therefrom, and a spout located at the side of the cap, said spout having an opening therein, which is located at the side of the cylindrical cap.

A cylindrical or tapered shell, the outer surface of which is accurately fitted to the interior of the neck of the bottle is attached to the stem. A tapered valve seat may be formed in the interior of said shell, with a substantially conical valve fitted to said valve seat to permit the liquid to flow out of the bottle thru the opening in the spout and shut off the flow of liquid into the bottle thru the spout opening.

When the bottle is filled with a beverage or other liquid and the cap is attached to the neck of the bottle, the liquid may be poured out of the bottle, the liquid in flowing thru the opening in the shell, forcing the valve off its seat, thus allowing the liquid to flow thru a series of connecting openings in the stem and cap, thence thru an opening at the side of the spout and out of the spout.

When the liquid is poured thru the opening in the spout, it flows into the hollow interior of the valve, thus forcing the valve against its seat, and preventing the flow of liquid into the bottle.

It will be understood that the foregoing general description of the construction and operation of various modifications of my invention and the following detailed description as well, are intended as explanatory of the invention and are not restrictive thereof.

In the drawings, the same reference numerals designate the same parts thruout the various views, except where otherwise indicated.

As indicated in Figs. 1 and 2, the combination bottle cap and spout comprises a cap body 1, which consists of a cylindrical cap 2, a stem 3, in the form of the frustum of a cone, integral with said cap and depending therefrom and a spout 4, located at the top of said cap which opens at the side of the cylindrical cap. The entire unit may be moulded in one piece of a plastic material, such as cellulose acetate or other suitable moulding material, which is impervious to alcohol, can be obtained in colors and is not unduly affected by the elements.

The stem 3, fits into a tapered hole 5, in the valve seat shell 6, the outer diameter of which fits the inner surface 7, of the neck 8, of the bottle. An integral ring 9, the cross-section thru which may be semi-circular, or any other suitable form, fits into an annular groove 10, formed at the inner surface of the shell 6. The groove 10, the bottom of which is also semi-circular in cross-section, is deeper than the lock ring 9, to permit the ring to snap into position without binding.

The inner cylindrical surface 15 of the cylindrical cap 2, is fitted over, or threaded onto the outer diameter 16, of the neck of the bottle.

The upper portion of the body contains an integral spout 4, which contains a substantially cylindrical opening 19, which may be either horizontal, or located at a small angle to the top of the cap. The upper portion of the outer surface 20, of the spout may be cylindrical in form, or tapered outward and flared into the cap, as indicated in Fig. 2. Where it is desired to reduce the overall height of the cap, the spout opening 19, may be made oval in cross-section. The end of the spout 4, may take the form of a cylindrical extension 21, extending outward beyond the side of the cylindrical cap 2, as indicated in Fig. 1, or the end 22, of the spout may be formed flush with the side of the external cap cylinder 23, or tangent to the corner radius of the cap cylinder, as indicated in Fig. 11.

A cylindrical orifice 25 is formed in the central portion of the stem 3 of the cap body. The orifice 25 may either be concentric with the stem or, it may be located at an angle to the axis of the stem, thus reducing the length of the upper spout opening 19 and consequently the distance the liquid travels, is being poured out of the cap.

The lower portion of the shell 6 has a tapered seat 26 to which the outer tapered portion 27 of the valve 28 is fitted. The valve is shown in detail in Figs. 5 and 6. The upper cylindrical portion 29 of the valve is loosely fitted in a cylindrical counterbore 30, formed above the tapered valve seat 26 in the shell. The tapered sides of the valve are connected at the bottom by means of a fillet 31, which streamlines the flow of liquid around the valve. The inner surface of the valve is also tapered to form a hollow conical surface 32. When the valve is closed some of the liquid left in the spout opening 19 and in the orifice 25 will flow back into the interior of the valve, the added weight assisting in effectively closing the valve.

A shallow countersink 35, is located at the bottom of the stem 3. Three or more radial webs 36, spaced equally, extend inward from the sides of the countersink 35, the bottom of said webs acting as stops 37, for the top 38, of the valve 28 when the valve is opened. A horizontal section showing the webs 36, in their relative radial position is shown in Fig. 16.

These stops may also take the form of series of arcuate sectors, formed within the countersink 35, or any other suitable form, the stops limiting the movement of the valve 28 when it is lifted off its seat, the space between the webs 36 permitting the liquid to flow thru the orifice 25 when the valve is in the open position.

The entire unit may be assembled before the cap is placed in the bottle. The valve 28 is dropped into position on its seat in the shell, after which the stem 3 is inserted into the tapered hole in the upper portion of the shell. The lock ring 9, drops into place within the groove 10 after a moderate pressure is applied on the cap 1. With the lock ring in position, the unit cannot be disassembled except by the use of either special tools, or by applying a great deal of force on the shell.

After the cap is assembled, the tapered outer diameter 39 of the shell is fitted into the tapered inner surface 7 of the neck of the bottle until it seats, the inner diameter 15, of the cylindrical cap fitting over the outer diameter of the neck 16 of the bottle. A short gap 40 is left between the under surface 41 of the cap, and the top 42 of the bottle neck, thus permitting the tapered shell to effectively close the neck of the bottle. A seal 43 is then formed between the bottom surface 44 of the cylindrical cap and the outer surface 16 of the neck of the bottle.

This seal may be made of a wax mixture, such as sealing wax, or a plastic material, which may be applied in the form of a paste, and which will solidify after it is applied.

After the cap is in place and the seal 43 dries in place, the cap cannot be removed, except by breaking the seal.

With the cap in place, when the neck of the bottle is tilted downward thru an angle so that the pouring spout opening 19 is in a substantially vertical position over a glass container, the pressure of the liquid on the outer surface 27 of the valve 28 forces the valve up against the stops 36, thus forming a tapered annular ring, between the tapered sides 27 of the valve and the valve seat 26. The liquid flows thru this annular ring thence thru the central orifice 25 in the stem, and the opening 19 in the spout, from which it drops into the glass or other container.

After all or a portion of the liquid is poured out of the bottle, any liquid poured thru the opening in the spout and the central orifice would drop into the inside of the valve, thus pressing the valve against the tapered seat.

Even if the valve were slightly off the conical seat 26 the liquid would pour around the cylindrical portion of the valve into the small annular space in the counterbore, thus preventing the flow of any additional liquid past the valve, until the liquid in the annular space is removed. The excess liquid in the annular space and any additional liquid poured into the spout would lodge in the interior of the valve, helping to close the valve.

The construction shown in Figs. 3 and 9 is substantially the same as that of Figs. 1 and 2, except that a separate snap ring 50 is used in place of the integral ring 9, to support the neck of the body in the shell.

The snap ring 50 fits into a groove 51, cut in the neck 52 of the cap body 53.

The depth of the groove 51 is considerably greater than the radius of the cross-section of the snap ring 50, to allow the snap ring to be compressed into the groove when the shell 54, is pressed over the neck 52. Another groove 55, which is substantially semi-circular in cross-section, the radius of the groove 55, being slightly greater than that of the snap ring 50, to allow clearance for the snap ring, is formed in the inner diameter 56, of the shell 54.

In assembling the cap body 53 and the shell 54, the snap ring 50 is dropped into place in the groove 51 on the stem of the body. The shell 54 is then assembled to the stem of the body, the inner diameter 56 of the shell forcing the ring 50 into the groove 51 in the stem. When the groove 55 in the shell is in alignment with the snap ring, the pressure on the ring is released, the outer portion of the ring expanding into the groove 55 formed in the inner diameter of the outer shell. This forms a permanent assembly of the cap, body and the valve seat shell.

In all other respects, the construction is the same as that shown in Figs. 1 and 2, and hereinbefore described. The valve and the valve seat are the same. The assembly of the cap to the neck of the bottle, is the same as that described above. The seal 43 is formed between the bottom surface 44, the cylindrical cap, and the outer surface 16 of the neck of the bottle, in the manner previously described, to seal the cap assembly on the bottle, and prevent its removal, except by breaking the seal.

The construction shown in Fig. 4, is substantially the same as that shown in Figs. 1 and 2, except that a threaded cylindrical cap 60 is used in place of the smooth cap 2 of Fig. 1.

Rounded, coarse threads 61 are formed on the upper portion of the neck 62 on many types of beverage bottles to fit a shallow, cylindrical cap. The inner diameter of the cylindrical cap 60 has internal threads 64, formed in it to fit the external threads 61, on the neck of the bottle.

While threads 61 and 64, the outer portion of which are semi-circular in cross-section are shown in Fig. 4, other forms of thread can be used with equal facility, if adequate clearance is left between the internal and external threads.

An integral lock ring 9 may be formed in the stem of the body, or a separate snap ring 50, may be used to connect the stem of the body, with the shell.

After assembling the body to the shell 65, the entire unit is fitted to the bottle by inserting the outer diameter 66 of the shell 65 into the inner diameter 67 of the threaded neck. A short gap is left between the top 68 of the neck of the bottle and the inner surface 69 of the cylindrical cap 60 to permit the outer diameter 66 of the shell to seat in the tapered inner surface 67 of the neck of the bottle.

Fig. 9 shows a horizontal section thru the snap ring 50, shown in Fig. 3. The deep inner groove 51, to provide space for the ring to be compressed into the stem, is shown in detail.

Fig. 11 represents a horizontal section thru the body of Fig. 1, showing the integral lock ring 9, in position in the annular groove 10, in the valve seat shell.

Having thus described several embodiments and variations of my invention, I do not wish to be limited thereby. What I claim is:

1. A non-refillable bottle cap comprising a body, a substantially cylindrical cap, attached to said body, a spout integral with said body, a valve, and a valve seat shell attached to said body, said valve seat shell having a seat for said valve formed therein, to permit a liquid to flow past said valve, in one direction, and prevent the flow of said liquid in the opposite direction.

2. A non-refillable bottle cap comprising a substantially cylindrical cap, a stem depending from said cap and integral therewith, a spout integral with said cap, a valve seat shell attached to said cap, and a valve seated in said seat, to permit the flow of a fluid past said valve in one direction and prevent the flow of said liquid in the opposite direction.

3. The combination of a bottle cap and spout, comprising a substantially cylindrical cap, internal threads in said cap for attaching said cap to the neck of a bottle, a stem integral with said cap, a valve seat support attached to said stem, and a valve seated in said support, to permit a fluid to flow past said valve to an opening in said spout, in one direction, and prevent the flow of said liquid, by said valve, in the opposite direction.

4. The combination of a bottle cap and spout comprising a substantially cylindrical cap, internal threads in said cap for attaching said cap to the neck of a bottle, a stem integral with said cap, a valve seat support fitted to said stem, said support having a valve seat formed therein, an integral lock ring formed on said stem, a groove formed in said valve seat support to receive said ring, thus locking said support onto said stem, and a valve, seated in said support to permit a fluid to flow by said valve in one direction, and prevent the flow of said fluid in the opposite direction, when said valve is in position against said valve seat.

5. The combination of a bottle cap and spout comprising a substantially cylindrical cap, means for sealing said cap against the neck of a bottle, a stem integral with said cap, a valve seat support fitted to said stem, said support having a valve seat formed therein, annular grooves formed in said stem and said valve seat support, a snap ring mounted within said annular grooves to attach said stem to said support, said support having a valve seat formed therein, and a valve movably seated in said valve seat to permit the flow of liquid around said valve, in one direction, and prevent the flow of said liquid in the opposite direction.

6. A bottle cap comprising a substantially cylindrical cap, a stem integral with said cap, a valve support attached to said stem, said support having a tapered valve seat formed therein, and a valve, said valve being of frusto-conical form, said valve support having an opening below said valve seat and connected therewith, to permit the flow of liquid past said valve, thru said opening, said valve obstructing the flow of said liquid in the opposite direction.

7. A bottle cap comprising a substantially cylindrical cap, a stem integral with said cap, a valve support attached to said stem, said support having a tapered valve seat formed therein, with a substantially cylindrical counterbore formed above said tapered valve seat, and a valve, the lower portion of said valve being of frusto-conical form, the upper end of said valve being substantially cylindrical, said support having an aperture below said valve seat, connected therewith, to permit the flow of liquid thru said opening, around said valve, said valve obstructing the flow of said liquid in the opposite direction.

8. The combination of a bottle cap and spout comprising a substantially cylindrical cap, means for attaching said cap to the neck of a bottle, a stem integral with said cap, a spout integral with said cap, a sleeve attached to said stem, said sleeve having a tapered valve seat formed therein, a valve, the lower portion of said valve being substantially in the form of a frustum of a cone and a plurality of substantially radial webs formed integral with said stem, said webs limiting the movement of said valve from said seat, said shell having an opening below said valve seat, in communication therewith, to permit the flow of liquid thru said opening, around said valve, and out thru an opening in said spout, said valve preventing the flow of said liquid thru said spout, in the opposite direction.

9. The combination of a non-refillable bottle cap and spout, comprising a substantially cylindrical cap, means attaching said cap to the neck of a bottle, a frusto-conical stem formed integral with said cap, a valve seat support attached to said stem, said support fitting the interior of the bottle neck, said support having a tapered valve seat formed therein, a frusto-conical valve fitted to said valve seat, means formed integral with said stem, limiting the upward movement of said valve, said cap having a spout formed integral therewith, the valve permitting a liquid to flow through the stem, out of the spout, and preventing the return flow of liquid through the spout.

10. The combination of a non-refillable bottle cap and spout, comprising a substantially cylindrical cap, means attaching said cap to the neck of a bottle, a frusto-conical stem formed integral with said cap, a valve seat support attached to said stem, said support fitting the interior of the bottle neck, said support having a tapered valve seat formed therein, a frusto-conical valve fitted to said valve seat, a plurality of radial webs formed integral with the stem, in substantial alignment with the valve seat, said webs limiting the movement of the valve in the open position, said cap having a spout formed integral therewith, the valve permitting a liquid to flow through the stem, out of the spout, and preventing the return flow of liquid through the spout.

WILLIAM SANDLER.

REFERENCES CITED

The following references are of record in the file of this patent:

UNITED STATES PATENTS

| Number | Name | Date |
|---|---|---|
| 1,321,411 | Alo | Nov. 11, 1919 |
| 1,370,708 | Sideris | Mar. 8, 1921 |
| 1,750,591 | Hafermann | Mar. 11, 1930 |
| 1,990,076 | Kanz | Feb. 5, 1935 |
| 2,069,005 | Damsel | Jan. 26, 1937 |
| 2,080,214 | Patterson | May 11, 1937 |
| 2,122,595 | Stonebraker | July 5, 1938 |
| 2,232,129 | Nelson | Feb. 18, 1941 |
| 2,241,394 | Duffy | May 13, 1941 |
| 2,351,227 | Petrone | June 13, 1944 |